Dec. 9, 1969  G. HACHTEL  3,482,773
ANTIPICK ODOMETER
Filed Nov. 18, 1968
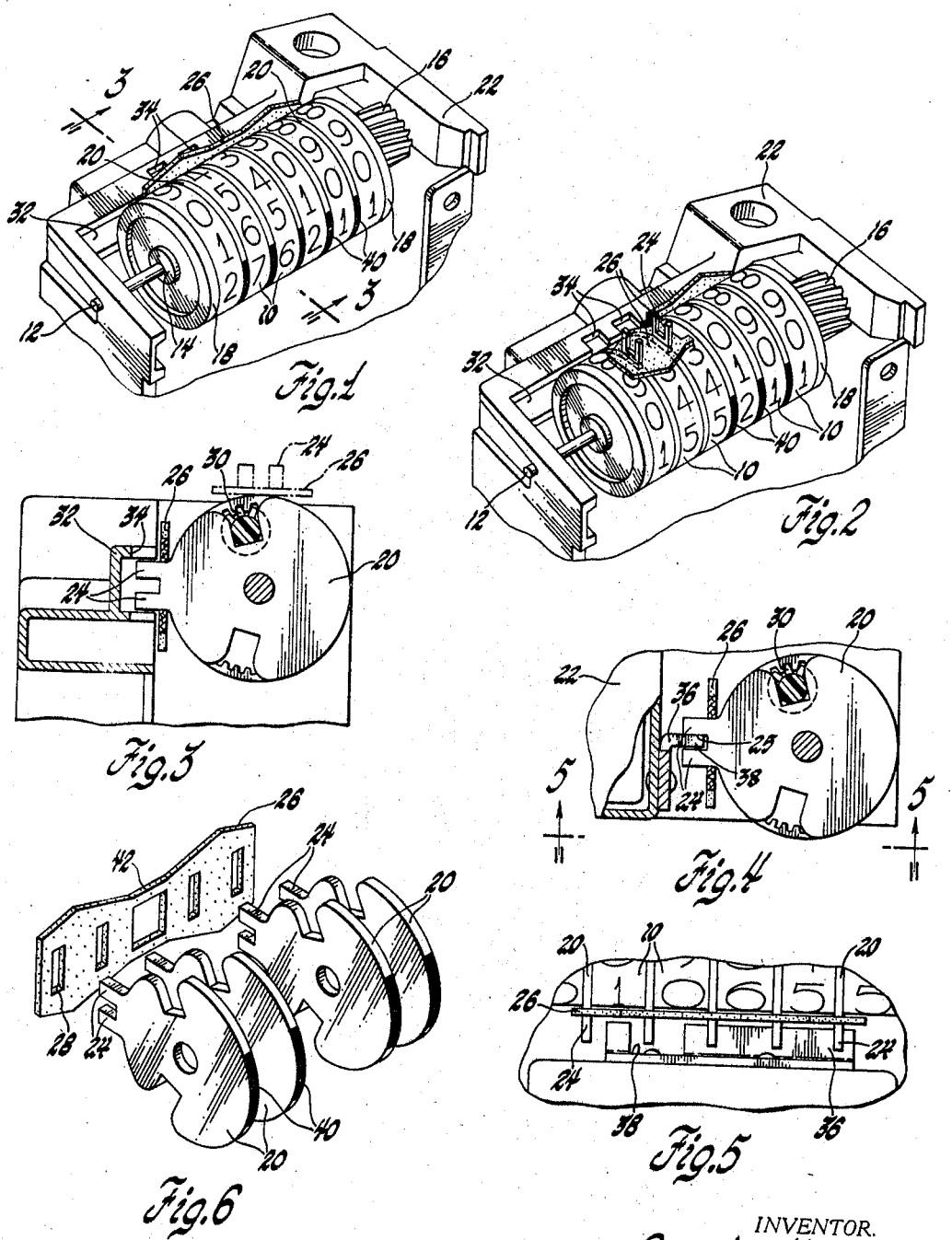
INVENTOR.
Guenter Hachtel
BY
P. A. Taucher
ATTORNEY

United States Patent Office 3,482,773
Patented Dec. 9, 1969

3,482,773
ANTIPICK ODOMETER
Guenter Hachtel, Swartz Creek, Mich., assignor to General Motors Corporation, Detroit, Mich., a corporation of Delaware
Filed Nov. 18, 1968, Ser. No. 776,371
Int. Cl. G01c 22/00
U.S. Cl. 235—95                                    5 Claims

ABSTRACT OF THE DISCLOSURE

The invention relates to a numbered wheel type of odometer and more particularly to such an odometer having provision for indicating odometer tampering. The odometer provides a visual presentation when the numbered wheels are tampered with, such as being turned back in the attempt to indicate a lesser reading than actually recorded.

---

This invention relates to odometers of the numbered wheel type generally used on automobiles to record the mileage of the automobile and is similar to U.S. Patent No. 3,137,444. However, the type of odometer shown by the prior art can be tampered with and the reading changed to a lesser number rather quickly and easily. This is done, for example, by using a sharp tool such as a lock pick to separate the numbered wheels from the pinion carrier plate to reach the pinion gears. The pinion gears of the numbered wheels themselves are then rotated to a lower number to indicate a lower reading or lower mileage than that actually driven.

It is therefore an object of this invention to provide an automobile odometer with means of indicating tampering.

It is another object to provide a breakable member adjacent to and at the outer surface of the numbered wheels to hold the pinion carrier plates in alignment with such member being broken if the numbered wheels are moved other than by the normal drive means.

It is a further object of this invention to provide a means of maintaining the odometer components in alignment during normal operation, wherein such means will readily permit an indication of tampering.

These and other features of the invention are shown and described in detail in the specification and drawings and claimed more particularly in the appended claims wherein:

FIGURE 1 is a perspective view showing an assembled odometer having the breakable strap member in normal operating position;

FIGURE 2 is a perspective view showing the odometer after being tampered with and with the breakable strap member broken;

FIGURE 3 is a sectional view in the direction of arrows 3—3 in FIGURE 1;

FIGURE 4 is a view similar to that of FIGURE 3 but showing a different retaining means on the housing than that shown on FIGURE 3;

FIGURE 5 is a sectional view in the direction of arrows 5—5 of FIGURE 4;

FIGURE 6 is an exploded perspective view of the pinion carrier plates as they relate to the breakable strap member.

There is shown in FIGURE 1 an odometer assembly having numbered wheels 10 mounted for rotation on a shaft 12. Friction washers 14 are fixed to ends of the shaft and maintain the numbered wheels 10, drive gear 16, end plates 18 and pinion carrier plates 20 in an assembled operating relationship during normal operation. As shown in FIGURE 6, each of the pinion carrier plates has a tongue 24 which fits into a breakable member 26 having mating apertures 28 therein. Member 26 is made to fit over the tongues 24 to hold the tongues on the pinion carrier plates 20 adjacent the high-count numbered wheels in alignment with a tongue on at least one of the pinion carrier plates 20 adjacent the low-count numbered wheels. As an example, the high-count numbered wheels could be those that generally read one thousand or above, and the low-count wheels could be those numbered wheels that generally indicate a lesser reading than one thousand. However, the above is only an example and any combination of high and low numbered wheels could be used. The breakable member 26, which may be made of plastic, fibrous material and the like, is used to initially hold the pinion carrier plates and, therefore, the assembly in alignment. The above entire assembly, including breakable member 26 is assembled into a housing 22.

In positioning the counting assembly within the housing, a first group of the tongues 24 on the pinion carrier plates adjacent to and associated with the low-count wheels are placed in a channel 32 in housing 22, which channel serves to lock the pinion carrier plates from movement. As is well known in the art, the pinion carrier plates must be locked or restrained against rotation in order that the pinion gears 30, through a normal drive means, can drive the numbered wheels. A second group of tongues 24 on the plates 20 adjacent to and associated with the high-count wheels are held in alignment with the first group by breakable member 26, which as described above, is positioned on the tongues of both the first and the second groups of pinion carrier plates. This arrangement locks the entire assembled group of pinion carrier plates within the channel 32.

As shown at 34, slots are cut in channel 32 to permit the tongues on the second group of pinion carrier plates adjacent the high-count numbered wheels to rotate out of alignment within the channel. It is understood that in place of the slots, some other convenient housing structure may be used, the criteria being that the pinion carrier plates adjacent those high-count numbered wheels required to be rotated if the odometer is tampered with, will be free to so rotate if the member 26 is broken.

There is shown in FIGURES 4 and 5 a second embodiment of my invention, the primary difference being in the type of confining or lock member used to lock the first group of pinion carrier plate tongues 24. As shown in this embodiment, a separate lock bar member 36 formed on the housing 22 and is positioned to extend into notches 25 formed in the tongues 24 of the first group of pinion carrier plates 20. This lock bar may be secured to the housing 22 or may be formed integrally therewith. As specifically shown in FIGURE 5, a notch 38 is cut into the lock means 36. However, it is understood the criteria for construction of the bar or lock means and operation of the two groups of pinion carrier plates is the same as set forth and described above regarding channel member 32.

In the past, the odometer has been easily tampered with by means of a lock pick or some similar tool. This is done by separating the numbered wheels from the pinion carrier plates to enable the numbered wheels to be easily rotated to indicate a lesser mileage. In the present invention, if this tampering operation is attempted, member 26 will break as shown in FIGURE 2, and the second group of pinion carrier plates locked in alignment previously by member 26 in relation to the first group of pinion carrier plates will be free to rotate out of the locked position. When this occurs, the high-count wheels no longer function or operate to provide a count. Member 26 is generally constructed to include a weakened portion and as shown in FIGURE 6, this portion would be at 42. This is the section which bridges the first and second group of pinion carrier plates. In normal operation, it should be noted that the portion of the pinion carrier plates are painted as indicated at 40 to blend in with the surrounding instrumentation to which the odometer is mounted and in contrast with the unpainted color of the pinion carrier plates. Upon tampering with the numbered wheels and upon movement of the carrier plates adjacent the numbered wheels, they will rotate whereby the contrasting color on the pinion carrier plates will appear and will indicate that tampering has occurred. This color may be red, or the natural color of the material of the pinion carrier plates prior to painting, or any color desired. A scribe means (not shown) instead of the color arrangement could be incorporated within the housing so that upon tampering and movement of the second group of the pinion carrier plates and numbered wheels, a line would be scribed on the numbered wheels to indicate tampering.

The indicating device used is a simple and easily manufactured combination of a breakable aligning strap member and visual indicating means on the pinion carrier plates or numbered wheels, wherein, upon the strap being broken during tampering, an indication will be made visible of such tampering.

I claim:

1. In an odometer having a reversal indicating means, the combination comprising a housing, a plurality of driven numbered wheels assembled in said housing having pinion carrier plates therebetween and adjacent thereto; said pinion carrier plates having tongues thereon, drive means to rotate said numbered wheels, breakable means adjacent said numbered wheels and positioned on said tongues to retain said tongues in alignment, lock means on said housing to lock a first group of said aligned tongues to said housing, a second group of said tongues being locked and held in alignment with respect to said first group by said breakable means whereby upon said second group of pinion carrier plates being moved because of rotation of the numbered wheels adjacent thereto by other than said drive means, said breakable means will break, allowing the second group of pinion carrier plates and numbered wheels to rotate freely, to provide an indication of tampering.

2. The combination as set forth in claim 1, wherein said breakable means adjacent said numbered wheels is a plastic member having aligned apertures therein to fit on the second group of pinion carrier plate tongues and on at least one of said first group of pinion carrier plate tongues.

3. The combination as set forth in claim 2, wherein said plastic member has a weakened portion between said first and second group of aligned numbered wheels.

4. The combination as set forth in claim 1, wherein said lock means is a channel in said housing adapted to receive said first group of pinion carrier plate tongues therein.

5. The combination as set forth in claim 1, wherein said lock means is a bar on said housing positioned so as to fit within notches formed in the ends of the tongues on said pinion carrier plates.

References Cited

UNITED STATES PATENTS

| | | | |
|---|---|---|---|
| 2,004,881 | 6/1935 | Slye | 235—144 |
| 2,243,738 | 5/1941 | Mather | 74—160 |
| 3,137,444 | 6/1964 | Harada | 235—117 |

STEPHEN J. TOMSKY, Primary Examiner